United States Patent [19]

Tayama et al.

[11] Patent Number: 4,533,689
[45] Date of Patent: Aug. 6, 1985

[54] FLAME RESISTANT ACRYLIC RESIN COMPOSITION AND PROCESS FOR ITS PRODUCTION

[75] Inventors: Suehiro Tayama; Norihisa Kusakawa, both of Toyama, Japan

[73] Assignee: Mitsubishi Rayon Company, Limited, Tokyo, Japan

[21] Appl. No.: 523,763

[22] Filed: Aug. 17, 1983

[30] Foreign Application Priority Data
Sep. 1, 1982 [JP] Japan .................. 57-152349
Sep. 2, 1982 [JP] Japan .................. 57-153316

[51] Int. Cl.³ .............. C08K 5/50; C08K 5/51; C08F 222/04
[52] U.S. Cl. .................. 524/130; 524/145; 525/255; 526/272; 526/317; 526/329.2
[58] Field of Search .......... 524/130, 145; 525/255; 526/272, 317, 329.2

[56] References Cited

U.S. PATENT DOCUMENTS

| | | | |
|---|---|---|---|
| 3,480,598 | 11/1969 | Nield | 526/272 |
| 3,666,712 | 5/1972 | Weil | 524/145 |
| 3,794,616 | 2/1974 | Dennis et al. | 524/145 |
| 4,144,387 | 3/1979 | Anderson et al. | 524/130 |

FOREIGN PATENT DOCUMENTS 1927460 12/1970 Fed. Rep. of Germany .
1228328 3/1960 France .

OTHER PUBLICATIONS

Chemical Abstracts, vol. 81, No. 14, Oct. 7, 1974, p. 37, No. 78727j and JP-A-74 10156.

Primary Examiner—John Kight
Assistant Examiner—Kriellion Morgan
Attorney, Agent, or Firm—Oblon, Fisher, Spivak, McClelland & Maier

[57] ABSTRACT

A flame resistant acrylic resin composition comprising a polymer composed of from 40 to 88% by weight of methyl methacrylate, from 1 to 15% by weight of α-methyl styrene, from 5 to 15% by weight of styrene, from 5 to 15% by weight of maleic anhydride and from 1 to 15% by weight of methacrylic acid, and a flame retardant.

13 Claims, 1 Drawing Figure

FIGURE 1

FLAME RESISTANT ACRYLIC RESIN COMPOSITION AND PROCESS FOR ITS PRODUCTION

The present invention relates to a flame resistant acrylic resin composition having high flame resistance and superior physical properties and a process for producing it. More particularly, the present invention relates to a flame resistant acrylic resin composition composed of a combination of a flame retardant and a copolymer of methyl methacrylate/styrene/maleic anhydride/α-methyl styrene/methacrylic acid and having superior physical properties, and a process for producing it.

Acrylic resins are thermoplastic resins composed mainly of methyl methacrylate, and by virtue of their superior transparency, excellent weather resistance and good mechanical properties and heat resistance, they are widely used for illumination materials, signboards, displays, construction materials, materials for electric appliances, etc. However, they are flammable and their applications are thereby restricted.

It is already known that flame resistance can be imparted by incorporating certain organic phosphoric acid esters to such acrylic resins. However, these organic phosphoric acid esters usually have a plasticizing effect, and they are likely not only to substantially lower the heat distortion temperature of the acrylic resin products thereby obtained, but also to lower the mechanical strength thereof. Further, the water absorptivity of the resin products tends to increase by the incorporation of such flame retardants, and when used outdoors, the resin products are likely to undergo deformation or crazing upon absorption of water.

Extensive researches have been conducted to overcome the above-mentioned drawbacks of the conventional flame resistant acrylic resins, and it has been found that it is possible to obtain a novel flame resistant resin composition having superior heat resistance and lower water absorptivity as compared with the conventional flame resistant acrylic resins while maintaining equal or superior flame resistance by using a copolymer having a certain specific composition of methyl methacrylate/styrene/maleic anhydride/α-methyl styrene/methacrylic acid and combining the copolymer with a flame retardant. The present invention has been accomplished based on this discovery.

Namely, the present invention provides a flame resistant acrylic resin composition characterized by a combination of a copolymer composed of:

(A) from 40 to 88% by weight of methyl methacrylate;
(B) from 1 to 15% by weight of α-methyl styrene;
(C) from 5 to 15% by weight of styrene;
(D) from 5 to 15% by weight of maleic anhydride; and
(E) from 1 to 15% by weight of methacrylic acid, and a flame retardant.

Further, present invention provides a process for producing a flame resistant acrylic resin composition, which comprises adding a flame retardant to a mixture comprising from 40 to 88% by weight of a methyl methacrylate monomer or its partial polymer, from 1 to 15% by weight of α-methyl styrene, from 5 to 15% by weight of styrene, from 5 to 15% by weight of maleic anhydride and from 1 to 15% by weight of methacrylic acid, or to a partial polymer of the mixture, and then polymerizing the mixture or its partial polymer in the presence of a polymerization initiator.

The term "partial polymer" in the present specification means a polymer-in-monomer solution or so called syrup.

Now, the present invention will be described in detail with reference to the preferred embodiments.

In the present invention, component (A) i.e. from 40 to 88% by weight of a methyl methacrylate monomer or its partial polymer, is a component required to maintain the desirable optical characteristic, weather resistance or mechanical properties intrinsic to a methacrylic resin. If the amount of component (A) is less than 40% by weight, these desirable properties will be lost. On the other hand, if the amount exceeds 88% by weight, the heat resistance and flame resistance will not be adequately improved.

The α-methyl styrene as component (B) is one of the components required to improve the heat resistance of the copolymer, and is used in an amount within a range of from 1 to 15% by weight, preferably from 3 to 10% by weight. If the amount is less than 1% by weight, no adequate heat resistance will be obtained. On the other hand, if the amount exceeds 15% by weight, the mechanical properties will be inferior and the productivity will be lowered.

The styrene as component (C) does not directly serve to improve the heat resistance or the flame resistance, but it serves to improve the copolymerization reactivity of components (B) and (D) which serve to improve the heat resistance, thus indirectly contributing to the improvement of the heat resistance. At the same time, this styrene exhibits remarkable effectiveness for the improvement of the productivity and also provides extremely good effectiveness for the improvement of the mechanical properties, coloring properties and molding processability of the copolymer. Especially, with respect to the improvement of the mechanical properties and coloring properties, unexpectedly remarkable effectiveness has been observed. Styrene is used in an amount of from 5 to 15% by weight. If the amount is less than 5% by weight, the productivity will be inferior. On the other hand, if the amount exceeds 15% by weight, the heat resistance and optical characteristics tend to be lowered.

The maleic anhydride as component (D) serves to improve the copolymerization reactivity of components (A) and α-methyl styrene, and it interacts with styrene to improve the heat resistance of the copolymer. Maleic anhydride is used in an amount within the range of from 5 to 15% by weight, preferably from 10 to 15% by weight. If the amount is less than 5% by weight, the productivity and the heat resistance will be inferior, and if the amount exceeds 15% by weight, the mechanical properties and the heat resistance tend to be lowered.

The methacrylic acid as component (E) exhibits substantial effectiveness for the improvement of the flame resistance and the heat resistance of the flame resistant resin composition of the present invention. It is used in an amount of from 1 to 15% by weight, preferably from 3 to 10% by weight, more preferably from 5 to 7% by weight. If the amount is less than 1% by weight, no adequate effectiveness for the improvement of the flame resistance and the heat resistance will be obtained, and if the amount exceeds 15% by weight, the haze of the flame resistant resin composition tends to increase and the water absorptivity will also increase, thus bringing about adverse effects.

Having thus described the monomer components (inclusive of a partial polymer in the case of methyl methacrylate) required for the synthesis of the base polymer to be used in the present invention and their proportions, it is most desirable for the productivity and the overall balance of the resin properties such as the heat resistance, flame resistance, mechanical properties, optical characteristics and processability of the copolymer to be obtained that the proportional ratio $(\alpha+\beta)/\gamma$ is within a range of from 1.1 to 1.5 where $\alpha$ is mols of $\alpha$-methyl styrene, $\beta$ is mols of styrene and $\gamma$ is mols of maleic anhydride. When the value $(\alpha+\beta)/\gamma$ is smaller than 1.1, the mechanical property, the water resistance and the optical characteristics tend to be inferior. On the other hand, if the value is greater than 1.5, the heat resistance tends to decrease.

Further, depending upon the particular purpose, there may be added up to 20% by weight of one or more other components, for instance, other copolymerizable monomers such as acrylic acid, methyl acrylate, ethyl acrylate, ethyl methacrylate, butyl acrylate, butyl methacrylate and vinyl acetate, or polyfunctional crosslinkable monomers such as divinyl benzene, triallyl cyanurate, triallyl isocyanurate, ethylene glycol dimethacrylate, triethylene glycol dimethacrylate and trimethylol propane trimethacrylate.

Methacrylic acid of component (E) as one of the monomer components constituting the base polymer of the present invention, may be partially or wholly replaced by other organic acids, for instance, an unsaturated or saturated organic acid such as acrylic acid, maleic acid or itaconic acid, if required. However, when methacrylic acid is used as in the present invention, the effectiveness for improvement of the flame resistance and the heat resistance is remarkable.

As the flame retardant for the present invention, it is possible to use an optional commercially available flame retardant. However, a particularly effective flame retardant for the combination with the resin composition of the present invention is a halogen-containing flame retardant such as a halogen-containing condensed phosphoric acid ester or a halogenated polyphosphonate. As the halogen-containing condensed phosphoric acid ester, a chlorinated polyphosphate is preferred. Among chlorinated polyphosphates, those having a phosphorus content of from 5 to 30% by weight, preferably from 10 to 20% by weight, chlorine content of from 20 to 40% by weight and a molecular weight of from 300 to 1000, are particularly preferred as they provide great effectiveness for the improvement of the flame resistance. As such chlorinated polyphosphates, there may be mentioned, for instance, CR-505, CR-509, CR-511 and C-513 manufactured by Daihachi Kagaku Kogyosho, Piroll 77 manufactured by Kashima Kogyo K.K. and AFR-TH 101 manufactured by Asahi Glass Company Ltd. Among them, CR-509 is particularly effective when used in the present invention. The accurate structure of CR-509 is not known. However, it is a chlorine-containing condensed phosphoric acid ester having a phosphorus-carbon bond, and it has a chlorine content of 26.0% by weight, a phosphorus content of 14.0% by weight and a molecular weight of about 650.

As the halogenated polyphosphonate to be used in the present invention, chlorinated polyphosphonates are preferred. Among them, a compound of the following formula manufactured by U.S. Monsanto Co. and called Phosguard C-22-R is particularly effective.

The amount of the above-mentioned halogen-containing flame retardant to be used in the present invention may be varied depending upon the degree of the flame resistance required for a particular product, but is usually from 3 to 40% by weight, preferably from 10 to 30% by weight in the formed resin product. If the amount of the flame retardant is less than 3% by weight, no adequate flame resistance will be imparted, and if the amount exceeds 40% by weight, the heat resistance tends to decrease and the water absorptivity tends to increase, thus leading to deterioration of the physical properties.

Further, if an alkyl acid phosphate is used as an assistant flame retardant in combination with the above-mentioned halogen-containing condensed phosphoric acid ester or the halogenated polyphosphonate, a synergistic effect for the flame resistance will be obtained, and when combined with the composition of the present invention, it is particularly effective. The alkyl acid phosphate to be used in combination as an assistant flame retardant in the present invention is usually present in the form of a mixture of equimolar amounts of a monoalkyl acid phosphate of the formula:

and a dialkyl acid phosphate of the formula:

However, the mixture is not restricted to the equimolecular mixture. In the above formulas, R is an alkyl group having from 2 to 6 carbon atoms. Among these alkyl acid phosphates, ethyl acid phosphate and butyl acid phosphate are superior in the synergistic effect for the flame resistance. Particularly preferred is butyl acid phosphate. In order to obtain the synergistic effect in combination with the halogen-containing condensed phosphoric acid ester or the halogenated polyphosphonate, the alkyl acid phosphate is used in an amount within a range of from 0.1 to 8% by weight, preferably from 0.5 to 6.0% by weight, more preferably from 1.0 to 4.0% by weight in the composition. If the amount of this alkyl acid phosphate is less than 0.1% by weight in the composition, no adequate synergistic effect is obtainable. On the other hand, if the amount exceeds 8% by weight, the plasticizing effect becomes too great, whereby the water absorptivity of the formed resin product tends to be increased, such being undesirable.

There is no particular restriction to the process for the preparation of the resin composition of the present invention so long as it does not adversely affect the object of the present invention. For instance, there may be mentioned a method wherein a flame retardant is added to the above-mentioned monomer mixture or its partial polymer, and the mixture is subjected to bulk polymerization or solution polymerization in the presence of a polymerization initiator, and a method wherein a copolymer composed of the above-mentioned monomers is blended with a flame retardant.

As a preferred embodiment of the method wherein the flame retardant is added to the monomer mixture or its partial polymer, and the mixture thereby obtained is polymerized in the presence of a polymerization initiator, there may be mentioned casting polymerization as a kind of bulk polymerization wherein from 0.01 to 1.0% by weight of a polymerization initiator is added to the above-mentioned monomer mixture or its partial polymer; the mixture thereby obtained is heated at a temperature of from 50° to 150° C., preferably from 65° to 100° C. to obtain a partial polymer; to the partial polymer thereby obtained, a flame retardant and an additional amount of the polymerization initiator are added and dissolved; the mixture thereby obtained is poured into a cell composed of mold plates made of tempered glass, stainless steel or aluminum and gaskets made of polyvinyl chloride, and polymerized at a temperature of from 50° to 90° C.; and then polymerization is conducted at a temperature of from 100° to 160° C. for from 10 to 180 minutes. For this casting polymerization, a so-called continuous sheet-forming process by means of endless belts may be employed. The continuous sheet-forming process is a process wherein a polymerization feed material comprising a flame retardant, a polymerization initiator and a mixture (feed material) composed of from 40 to 88% by weight of a methyl methacrylate monomer or its partial polymer, from 1 to 15% by weight of α-methyl styrene, from 5 to 15% by weight of maleic anhydride and from 1 to 15% by weight of methacrylic acid, is supplied to the up-stream end of a casting space defined by mutually facing surfaces of two endless belts running in face-to-face relationship with a distance from each other and gaskets held between the facing surfaces along both sides of the endless belts and running along with the endless belts; the feed material is continuously polymerized in the casting space; and a polymer sheet thereby formed is withdrawn from the down-stream of the casting space.

There is no particular restriction as to the method for preparing the partial polymer for the casting polymerization. In addition to the above-mentioned method, there may be mentioned, for instance, a method wherein to a partial polymer of methyl methacrylate, the above-mentioned other monomer components and a flame retardant are mixed and dissolved, or a method wherein a homopolymer of methyl methacrylate or its copolymer and a flame retardant are dissolved in a mixture of methyl methacrylate and other monomers. The composition of the polymer portion of the partial polymer may be different from the composition of the mixture of the monomers.

As the polymerization initiator to be used for the casting polymerization, there may be used known radical polymerization initiators, for instance, azobis-type catalysts such as azobisisobutylonitrile and 2,2′-azobis-2,4-dimethylvaleronitrile; diacylperoxide-type catalysts such as lauroyl peroxide, benzoyl peroxide and bis(3,5,5-trimethylhexanoyl)peroxide; and percarbonate-type catalysts. Polymerization initiators particularly suitable for the continuous sheet-forming process are those having a decomposition temperature, at a half-value period of 10 hours, of from 30° to 90° C., preferably from 40° to 80° C. Among them, 2,2′-azobis-2,4-dimethylvaleronitrile, azobisisobutylonitrile, bis(3,5,5-trimethylhexanoyl)peroxide and bis(4-t-butylcyclohexyl)peroxydicarbonate are particularly preferred.

For the resin composition of the present invention, if desired, two or more known flame retardants may be used in combination. Further, if required, there may be incorporated other additives such as a ultra-violet absorbing agent, a releasing agent, a heat stabilizer, a plasticizer, a lubricant, an antistatic agent, a foaming agent, a dispersing agent or a coloring agent. Furthermore, inorganic fillers such as aluminum hydroxide, magnesium hydroxide, glass fibers or glass powder; metal powder; or carbon black may be added.

Now, a continuous sheet-forming apparatus to be used for the process for producing a sheet material i.e. a molded product of the flame resistant acrylic resin of the present invention by the continuous sheet-forming process, will be described with reference to the accompanying drawing.

However, the continuous sheet-forming apparatus to be used in the present invention is not restricted to the apparatus shown in the drawing.

Figure 1:
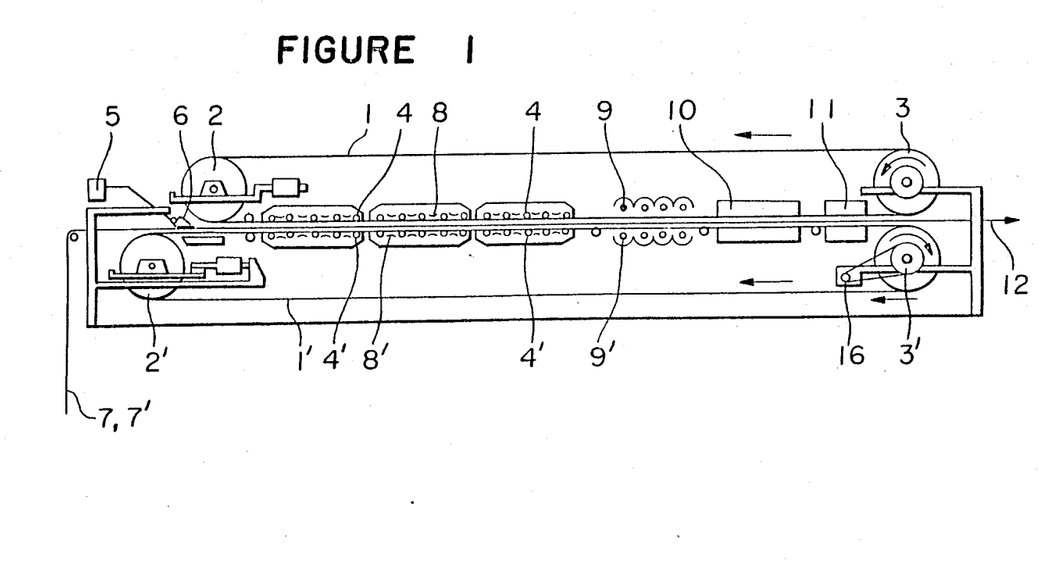
FIG. 1 illustrates an embodiment of the apparatus to be used for carrying out the process of the present invention.

Referring to FIG. 1, reference numerals 1 and 1′ designate endless belts, which are usually metallic belts made of steel or stainless steel.

These metallic belts are thoroughly polished or, in some cases, plated to provide a smooth surface to obtain a sheet having a good outer appearance. The thickness of the metallic belts is usually from 0.1 to 3 mm, preferably from 0.5 to 2 mm.

A predetermined tension is imparted to the belts by main pulleys 2, 3 and 2′, 3′. In the embodiment illustrated in FIG. 1, the main pulleys 2 and 2′ are provided with hydraulic cylinders, and the tension of the belts can be adjusted by changing the hydraulic pressure. It is also known to adjust the tension of the belts by means of a mechanical means such as springs or the like. The tension of the belts is preferably as high as possible to improve the configuration of the belts to increase the thickness precision of the sheet. The operation is usually conducted at a tension of from 3 to 15 kg/mm$^2$.

The belts are driven to run by driving the main pulley 3′. The belts are adjusted to avoid staggering by controlling the angle between the main pulleys 2 and 3 and the main pulleys 2′ and 3′. The staggering of the belt may also be controlled by changing the angles of rolls 4 and 4′ which are in contact with the rear surfaces of the respective belts or rolls provided at the return side of the belts, which are not shown.

Reference numeral 5 designates an apparatus for supplying the polymerization feed material, whereby monomers or partial polymers (syrup) mixed with a catalyst and other additives are supplied at a constant flow rate usually by means of quantitative pump. Reference numeral 6 designates an injection apparatus to supply the liquid polymerization feed material to the space between the belts facing to each other. Reference numerals 7 and 7′ designate gaskets running along with the belts as they are held between the belts facing to each other, whereby they prevent the polymerization feed material from leaking out of the belts. The gaskets are usually made of soft polyvinyl chloride, polyethylene, an ethylene-vinyl acetate copolymer, polyurethane or other material.

Reference numerals 4 and 4′ designate groups of rolls which support the opposing belts from their rear sides. The rolls are arranged so that the polymerization feed material is thereby prevented from leaking out from the space defined by the opposing belts and the gaskets, in front of the polymerization zone or in the polymerization zone. The belts tend to flex between the adjacent rolls by the liquid pressure of the feed material or the repulsive force of the gasket. If this flexing becomes great, the thickness precision of the sheet will be poor. Further, if clearance is formed between the belts and the gaskets, the polymerization feed material will leak.

In some cases, it is possible that air comes in through the clearance to form foams in the sheet. To avoid these troubles, the flexing of the belts should be minimized. For this purpose, it is preferred that the rolls are arranged to have a small distance between the adjacent rolls and the tension of the belts is increased. It is therefore desirable that the distance between the rolls i.e. the distance between the centers of the adjacent rolls, is set to be about from 20 to 100 cm. The rolls are provided so that even when the polymerization feed material is polymerized and contracted, they move along therewith and will not depart from the rear surfaces of the belts.

Reference numerals 8 and 8' designate spray apparatus to spray warm water to the belts to heat them. The warm water has an optional temperature not higher than 100° C. However, in order to improve the productivity to avoid an enlargement of the continuous polymerization apparatus, it is desirable that the polymerization should be carried out as rapidly as possible. For this reason, the temperature of the warm water is usually from 50° to 95° C. Reference numerals 9 and 9' designate far infrared heaters provided at the second polymerization zone to heat the sheet at a temperature of at least 100° C., usually from 100° to 160° C. to remove the remaining monomers.

The far infrared heaters are effective heating means for raising the temperature of the sheet. In order to effectively utilize the heat quantity of the heaters, the heaters are usually covered, together with the belts, by a heat shielding duct. The heated sheet is passed through the heat shielding duct so that it will be maintained at a predetermined temperature for a predetermined period of time. In order to obtain a proper temperature profile, a number of far infrared heaters may be provided or an air may be blown into the heat shielding duct. Other method, for instance, the provision of a hot air furnace may also be employed.

Reference numerals 10 and 11 designate cooling or temperature-maintaining zones for cooling the sheet passing through the second polymerization zone, under proper conditions.

Reference numberal 12 designates the sheet produced by the above process.

The process of the present invention makes it possible to produce a shaped product of a flame resistant acrylic resin having superior flame resistance continuously under high productivity. Moreover, it is thereby possible to produce an elongated sheet and a sheet having a great width which were hardly producible by the conventional glass cell casting method. Thus, the process of the present invention is industrially extremely advantageous.

The flame resistant acrylic resin composition according to the present invention has an extremely improved flame resistance as compared with the conventional flame resistant acrylic resin in which the same amount of the flame retardant is used. Especially when two types of flame retardants, i.e. a halogen-containing condensed phosphoric acid ester or a halogenated polyphosphonate and an alkyl acid phosphonate, are combined with the above-mentioned specific copolymer, particularly superior flame resistance and physical properties will be imparted by the synergistic effect of the components, whereby it is possible to reduce the amount of the main flame retardant to a level of about 20% even when flame resistance to meet the standard of V-0 under the UL Standards is to be imparted, and accordingly it is possible to avoid the deterioration of the physical properties, particularly the deterioration of the heat resistance, which used to be a serious problem when a great amount of the flame retardant was added.

The acrylic resin composition of the present invention has superior flame resistance and physical properties, and as such, is very useful for construction materials, materials for various electric appliances, signboards, glazing materials or illumination materials.

Now, the present invention will be described in further detail with reference to Examples, which are presented merely for the purpose of illustration of the present invention and by no means restrict the present invention. In the Examples, various physical properties were measured in accordance with the following methods.

(1) Combustion test
With respect to each set of five samples,
    (1) the combustion time (seconds) or its maximum value (seconds) after being contacted with a flame for 10 seconds in the first trial,
    (2) the combustion time (seconds) or its maximum value (seconds) after being contacted with a flame for 10 seconds in the second trial, and
    (3) the total of the combustion times (seconds) of the samples (five samples) measured in the first and second trials in the above combustion tests,
were measured by a vertical method in accordance with Subject 94 under the United States UL Standards.
(2) Heat distortion temperature (H.D.T.): Samples were dried by annealing them at 80° C. for 16 hours, and then, the heat distortion temperatures were measured in accordance with ASTM D-648.
(3) Water absorptivity: Samples dried by annealing at 80° C. for 16 hours, were immersed in city water for 24 hours and then wiped with a gauze to remove the deposited water, and the respective weight increases were measured (%).

EXAMPLE 1

Into a separable flask equipped with a condenser, a thermometer and a stirrer, 760 g of methyl methacrylate, 40 g of α-methyl styrene, 100 g of styrene and 100 g of maleic anhydride were introduced and heated under stirring. When the temperature in the flask reached 70° C., 1.0 g of 2,2'-azobis-(2,4-dimethylvaleronitrile) was added thereto. The mixture was maintained at an internal temperature of 95° C. for 10 minutes, and then cooled to room temperature, whereby a partial polymer (syrup) was obtained.

To 730 g of this partial polymer, 70 g of methacrylic acid, 200 g of Phosguard C-22-R (chlorinated polyphosphonate manufactured by U.S. Monsanto Company Ltd.), 1 g of Aerosol OT (dioctylsulfosuccinate) as a releasing agent and 640 mg of 2,2'-azobis-(2,4-dimethylvaleronitrile) were added and dissolved, and the composition thereby obtained was poured into a cell defined by two sheets of tempered glass facing each other with a distance of 3 mm and gaskets made of polyvinyl chloride, and polymerized by immersing the cell in warm water of 65° C. for 16 hours. Then, the cell was heat-treated at 135° C. for 2 hours in an air heating furnace. After cooling, the cell was removed to obtain a resin sheet having a thickness of about 3 mm. This resin sheet was subjected to a combustion test by the vertical method in accordance with Subject 94 under UL Standards.

With respect to a set of five samples, the combustion time after being contacted with a flame for 10 seconds in the first trial and the combustion time after being contacted for 10 seconds in the second trial, were measured. The results are shown in Table 1.

TABLE 1

| Sample No. | 1 | 2 | 3 | 4 | 5 |
|---|---|---|---|---|---|
| Combustion time after being contacted with a flame in the first trial (seconds) | 0.8 | 0.8 | 0.9 | 0.8 | 0.8 |
| Combustion time after being contacted with a flame in the second trial (seconds) | 0.8 | 0.8 | 0.8 | 0.9 | 1.0 |

COMPARATIVE EXAMPLE 1

A resin sheet of Comparative Example 1 was obtained in the same manner as in Example 1 except that a syrup was prepared by using 1000 g of a methyl methacrylate monomer alone instead of the monomer mixture comprising methyl methacrylate, α-methyl styrene, styrene and maleic anhydride. A combustion test was conducted in the same manner as in Example 1. The results are shown in Table 2.

TABLE 2

| Sample No. | 1 | 2 | 3 | 4 | 5 |
|---|---|---|---|---|---|
| Combustion time after being contacted with a flame in the first trial (seconds) | 1.2 | 0.9 | 1.7 | 1.1 | 0.9 |
| Combustion time after being contacted with a flame in the second trial (seconds) | 17.20 | 30.1 | 10.6 | 15.4 | 24.3 |

It is evident from the comparison of Tables 1 and 2 that the flame resistant acrylic resin composition of the present invention is substantially superior in its flame resistance to the conventional flame resistant acrylic resin composition wherein a copolymer of methyl methacrylate with methacrylic acid is used as the base polymer.

EXAMPLE 2

Into a separable flask equipped with a condenser, a thermometer and a stirrer, 1000 g of methyl methacrylate was introduced and heated under stirring. When the internal temperature reached 85° C., 650 mg of 2,2'-azobis-(2,4-dimethylvaleronitrile) was added, and the mixture was maintained at an internal temperature of 100° C. for 7 minutes, and then cooled to room temperature, whereby a partial polymer was obtained.

To 558.4 g of this partial polymer, 25.6 g of α-methyl styrene, 73 g of styrene, 73 of maleic anhydride, 70 g of methacrylic acid, 200 g of Phosguard C-22-R, 1 g of Aerosol OT and 640 mg of 2,2'-azobis-(2,4-dimethylvaleronitrile) were added and dissolved. The composition thereby obtained was poured into a cell defined by two sheets of tempered glass facing to each other with a distance of 3 mm and gaskets made of polyvinyl chloride, and polymerized by immersing the cell in warm water of 65° C. for 16 hours. Then, the cell was heat-treated at 135° C. for 2 hours in an air heating furnace. After cooling, the cell was removed to obtain a resin sheet having a thickness of 3 mm.

This resin sheet was subjected to a combustion test by the vertical method in accordance with Subject 94 under UL Standards. With respect to a set of five samples, the combustion times after being contacted with a flame for 10 seconds in the first and second trials were measured in the same manner as in Example 1. In each case, the combustion time was not more than 1 second, and the flame resistance was good.

COMPARATIVE EXAMPLE 2

A comparative resin sheet was obtained in the same manner as in Example 2 except that 730 g of the partial polymer of methyl methacrylate alone was used without using α-methyl styrene, styrene and maleic anhydride.

With respect to this resin sheet, a combustion test was conducted in the same manner as in Example 2. The results are shown in Table 3.

TABLE 3

| Sample No. | 1 | 2 | 3 | 4 | 5 |
|---|---|---|---|---|---|
| Combustion time after being contacted with a flame in the first trial (seconds) | 1.1 | 1.1 | 1.1 | 0.8 | 1.2 |
| Combustion time after being contacted with a flame in the second trial (seconds) | 18.4 | 10.5 | 15.6 | 14.5 | 25.3 |

The effect of the present invention is evident from the comparison of Example 2 with Comparative Example 2.

EXAMPLE 3

To 589 g of the partial polymer of methyl methacrylate prepared in Example 2, 27 g of α-methyl styrene, 77 g of styrene, 77 g of maleic anhydride, 30 g of methacrylic acid, 200 g of Phosguard C-22-R, 1 g of Aerosol OT and 640 mg of 2,2'-azobis-(2,4-dimethylvaleronitrile) were added and dissolved. The composition thereby obtained was poured into a cell defined by two sheets of tempered glass facing to each other with a distance of 3 mm and gaskets made of polyvinyl chloride, and polymerized by immersing the cell in warm water of 65° C. for 16 hours. Then, the cell was heat-treated at 135° C. for 2 hours in an air heating furnace. After cooling, the cell was removed to obtain a resin sheet having a thickness of 3 mm. This resin sheet was subjected to a combustion test by the vertical method in accordance with Subject 94 under UL Standards. The results are shown in Table 4.

The optical characteristic of this sheet was measured by ASTM D-1003, whereby the luminous transmittance was 92.8% and the haze was 1.2%. Further, the heat distortion temperature (ASTM D-648) was 78.5° C.

TABLE 4

| Sample No. | 1 | 2 | 3 | 4 | 5 |
|---|---|---|---|---|---|
| Combustion time after being contacted with a flame in the first trial (seconds) | 0.9 | 0.8 | 1.2 | 0.8 | 0.64 |
| Combustion time after | 1.0 | 3.8 | 4.8 | 1.2 | 0.8 |

TABLE 4-continued

| Sample No. | 1 | 2 | 3 | 4 | 5 |
|---|---|---|---|---|---|
| being contacted with a flame in the second trial (seconds) | | | | | |

COMPARATIVE EXAMPLE 3

A comparative resin sheet was prepared in the same manner as in Example 3 except that 612 g of the partial polymer of methyl methacrylate, 28 g of α-methyl styrene, 80 g of styrene and 80 g of maleic anhydride were used without using methacrylic acid in Example 3.

This resin sheet was subjected to a combustion test in the same manner as in Example 3, whereby the combustion times of the five samples after being contacted with a flame in the first trial were 23 seconds, 28 seconds, 8 seconds, 12 seconds and 10 seconds, respectively.

The flame retarding effect of methacrylic acid is evident from the comparison of Example 3 with Comparative Example 3.

EXAMPLE 4

Into a separable flask equipped with a condenser, a thermometer and a stirrer, 760 g of methyl methacrylate, 40 g of α-methyl styrene, 100 g of styrene and 100 g of maleic anhydride were introduced and heated under stirring. When the internal temperature of the flask reached 70° C., 1.0 g of 2,2'-azobis-(2,4-dimethylvaleronitrile) was added thereto. The mixture was maintained at an internal temperature of 95° C. for 10 minutes, and then cooled to room temperature, whereby a partial polymer was obtained.

To 720 g of this partial polymer, 60 g of methacrylic acid, 200 g of Phosguard C-22-R (chlorinated polyphosphonate manufactured by U.S. Monsanto Company Ltd.), 20 g of JP 504 (butyl acid phosphate manufactured by Jyohoku Chemical Industries Co. Ltd.) and 624 mg of 2,2'-azobis-(2,4-dimethylvaleronitrile) were added and dissolved. The composition thereby obtained was poured into a cell defined by two sheets of tempered glass facing to each other with a distance of 3 mm and gaskets made of polyvinyl chloride, and polymerized by immersing the cell in warm water of 65° C. for 16 hours. Then, the cell was heat-treated at 135° C. for 2 hours in an air heating furnace. After cooling, the cell was removed to obtain a resin sheet having a thickness of about 3 mm. The physical properties of this sheet were evaluated. The results are shown in Table 5.

COMPARATIVE EXAMPLE 4

A resin sheet of Comparative Example 4 was prepared in the same manner as in Example 4 except that a partial polymer was prepared by using 1000 g of a methyl methacrylate monomer alone instead of the monomer mixture comprising methyl methacrylate, α-methyl styrene, styrene and maleic anhydride. The physical properties of this sheet were evaluated. The results are shown in Table 5.

TABLE 5

| | Outer appearance of the resin sheet | Combustion test (seconds) | | | Heat distortion temp. (°C.) | Water absorptivity (%) |
|---|---|---|---|---|---|---|
| | | First trial (max. value) | Second trial (max. value) | Total of combustion times | | |
| Example 4 | Colorless and transparent No defect in the outer appearance | 0.1 | 0.3 | 2.5 | 75.6 | 0.60 |
| Comparative Example 4 | Colorless and transparent Small pleats like defects were observed on the surface | 4.0 | 32.0 | 160.2 | 65.9 | 0.71 |

It is evident from Table 5 that the flame resistant acrylic resin composition (Example 4) of the present invention has substantially improved flame resistance and heat distortion temperature as compared with the conventional flame resistant acrylic resin composition (Comparative Example 4) wherein a copolymer obtained from methyl methacrylate and methacrylic acid was used as the base polymer, and it meets the Standards of UL 94 V-O. Further, it is evident that the water absorptivity is also improved.

EXAMPLE 5

To 760 g of the partial polymer prepared in Example 4, 30 g of methacrylic acid, 200 g of Phosguard C-22-R, 10 g of JP 504, 640 mg of 2,2'-azobis-(2,4-dimethylvaleronitrile and 1 g of Aerosol OT (dioctylsulfosuccinate) were added and dissolved. The composition thus obtained was poured into a cell defined by two sheets of tempered glass facing to each other with a distance of 3 mm and gaskets made of polyvinyl chloride, and polymerized by immersing the cell in warm water of 65° C. for 16 hours. Then, the cell was heat-treated at 135° C. for 2 hours in an air heating furnace. After cooling, the cell was removed to obtain a resin sheet having a thickness of about 3 mm.

This sheet was subjected to a combustion test, whereby with respect to a set of five samples, the maximum value of the combustion time after being contacted with a flame for 10 seconds in the first trial was 0.3 seconds, and the maximum value of the combustion time after being contacted with a flame for 10 seconds in the second trial was 5.4 seconds, and the total of the combustion times was 11.6 seconds.

COMPARATIVE EXAMPLE 5

A comparative resin sheet was prepared in the same manner as in Example 5 except that JP 504 in Example 5 was not used. This resin sheet was subjected to a combustion test in the same manner as in Example 5, whereby with respect to a set of five samples, the maximum value of the combustion time after being contacted with a flame for 10 seconds in the first trial was 2.8 seconds, but the combustion time after being contacted with a flame for 10 seconds in the second trial exceeded 35.6 seconds in some cases. From the comparison between Example 5 and Comparative Example 5, the superior flame retarding effect by the combination of two types of the flame retardants according to the present invention is evident.

EXAMPLE 6

To 700 g of the partial polymer prepared in Example 4, 70 g of methacrylic acid, 200 g of Phosguard C-22-R, 30 g of JP 504 and 616 mg of 2,2'-azobis-(2,4-dimethylvaleronitrile) were added and dissolved. The composition thereby obtained was poured into a cell defined by two sheets of tempered glass facing to each other with a distance of 3 mm and gaskets made of polyvinyl chloride, and polymerized by immersing the cell in warm water of 65° C. for 16 hours. Then, the cell was heat-treated at 135° C. for 2 hours in an air heating furnace. After cooling, the cell was removed to obtain a resin sheet having a thickness of about 3 mm. This sheet was subjected to combustion test in the same manner as in Example 5, and the heat distortion temperature was measured. As the results, the combustion time of each sample after being contacted with a flame in the first trial was about 0.3 second, and the combustion time of each sample after being contacted with a flame in the second trial was not more than 1.0 second. The heat distortion temperature was 76.1° C.

COMPARATIVE EXAMPLE 6

A resin sheet was prepared in the same manner as in Example 6 except that 770 g of the partial polymer prepared in Example 4 was used without using methacrylic acid in Example 4. This resin sheet was subjected to a combustion test in the same manner as in Example 6, and the heat distortion temperature was measured. As the results, in the combustion test, the combustion time of each sample after being contacted with a flame in the first trial was not more than 1.0 second, but the maximum value of the combustion time after being contacted with a flame in the second trial was from 24 to 35 seconds, and the total of the combustion times was 160 seconds. Further, the heat distortion temperature was as low as 62.5° C.

EXAMPLE 7

Into a separable flask equipped with a condenser, a thermometer and a stirrer, 1000 g of methyl methacrylate was added and heated under stirring. When the internal temperature reached 85° C., 650 mg of 2,2'-azobis-(2,4-dimethylvaleronitrile) was added thereto. The mixture was maintained at an internal temperature of 100° C. for 7 minutes, and then, cooled to room temperature, whereby a partial polymer was obtained.

To 558.4 g of this partial polymer, 25.6 g of α-methyl styrene, 73 g of styrene, 73 g of maleic anhydride, 60 g of methacrylic acid, 180 g of Phosguard C-22-R, 30 g of JP 504, 1 g of Aerosol OT and 632 mg of 2,2'-azobis-(2,4-dimethylvaleronitrile) were added and dissolved. The composition thereby obtained was poured into a cell defined by two sheets of tempered glass facing to each other with a distance of 3 mm and gaskets made of polyvinyl chloride, and polymerized by immersing the cell in warm water of 65° C. for 16 hours. Then, the cell was heat-treated at 135° C. for 2 hours in an air heating furnace. After cooling, the cell was removed to obtain a resin sheet having a thickness of 3 mm. This resin sheet was subjected to a combustion test. With respect to a set of 5 samples, the combustion time after being contacted with a flame for 10 seconds in the first trial and the combustion time after being contacted with a flame for 10 seconds in the second trial were measured. The results thereby obtained are shown in Table 6.

TABLE 6

| Sample No. | 1 | 2 | 3 | 4 | 5 |
|---|---|---|---|---|---|
| Combustion time after being contacted with a flame in the first trial (seconds) | 0.6 | 0.5 | 0.4 | 0.6 | 0.8 |
| Combustion time after being contacted with a flame in the second trial (seconds) | 0.9 | 0.9 | 0.7 | 0.7 | 1.2 |

The optical characteristics of this resin sheet were measured in accordance with ASTM D-1003, whereby the luminous transmission was 91.8% and the haze was 1.3%, and the transparency was good. Further, heat distortion temperature was 75.4° C.

EXAMPLE 8

To 527.9 g of the partial polymer of methyl methacrylate prepared in Example 7, 24.1 g of α-methyl styrene, 69 g of styrene, 69 g of maleic anhydride, 60 g of methacrylic acid, 220 g of Phosguard C-22-R, 30 g of JP 504, 1 g of Aerosol OT and 600 mg of 2,2'-azobis-(2,4-dimethylvaleronitrile) were added and dissolved. The subsequent operation was conducted in the same manner as in Example 7, whereby a flame resistant acrylic resin composition of the present invention was obtained.

This sheet was subjected to a combustion test in the same manner as in Example 7. As the results, the combustion time of each sample after being contacted with a flame in the first trial, was almost 0 second, and the combustion time of each sample after being contacted with a flame in the second trial, was not greater than 1.0 second. Further, the total of the combustion times was 3 seconds. The luminous transmission of this sheet was 92.0%, and the haze was as good as 2.1%. Further, the heat distortion temperature was 72.0° C.

EXAMPLE 9

Into a separable flask equipped with a condenser, a thermometer and stirrer, 760 g of methyl methacrylate, 40 g of α-methyl styrene, 100 g of styrene and 100 g of maleic anhydride were introduced and heated under stirring. When the internal temperature reached 70° C., 1.0 g of 2,2'-azobis-(2,4-dimethylvaleronitrile) was added thereto. The mixture was maintained at an internal temperature of 95° C. for 10 minutes, and then cooled to room temperature, whereby a partial polymer was obtained.

To 730 g of this partial polymer, 70 g of methacrylic acid, 200 g of CR-509 (trade name for chlorinated polyphosphate manufactured by Daihachi Kagaku Kogyosho K.K.), 1 g of Aerosol OT (dioctylsulfosuccinate) as a releasing agent and 640 mg of 2,2'-azobis-(2,4-dimethylvaleronitrile) were added and dissolved. The composition thereby obtained was poured into a cell defined by two sheets of tempered glass facing to each other with a distance of 3 mm and gaskets made of polyvinyl chloride, and polymerized by immersing the cell in warm water of 65° C. for 16 hours. Then, the cell was heat-treated at 135° C. for 2 hours in an air heating furnace. After cooling, the cell was removed to obtain a resin sheet having a thickness of about 3 mm. This resin sheet was subjected to a combustion test by the vertical method in accordance with Subject 94 under UL Standards. With respect to a set of 5 samples, the combustion time after being contacted with a flame for 10 seconds in the first trial and the combustion time after being contacted with a flame for 10 seconds in the second trial were measured. The results are shown in Table 7.

TABLE 7

| Sample No. | 1 | 2 | 3 | 4 | 5 |
|---|---|---|---|---|---|
| Combustion time after being contacted with a flame in the first trial (seconds) | 0.8 | 0.8 | 0.8 | 0.8 | 0.9 |
| Combustion time after being contacted with a flame in the second trial (seconds) | 1.1 | 0.9 | 1.0 | 0.9 | 0.9 |

COMPARATIVE EXAMPLE 7

A resin sheet having a thickness of 3 mm was prepared in the same manner as in Example 9 except that a partial polymer was prepared by using 1000 g of a methyl methacrylate monomer alone instead of the monomer mixture comprising methyl methacrylate, α-methyl styrene, styrene and maleic anhydride. Then, a combustion test was conducted in the same manner as in Example 9. The results are shown in Table 8.

TABLE 8

| Sample No. | 1 | 2 | 3 | 4 | 5 |
|---|---|---|---|---|---|
| Combustion time after being contacted with a flame in the first trial (seconds) | 1.1 | 1.3 | 1.0 | 0.8 | 2.5 |
| Combustion time after being contacted with a flame in the second trial (seconds) | 20.8 | 32.2 | 30.8 | 28.7 | 25.8 |

It is evident from the comparison of the results in Tables 7 and 8 that the flame resistant acrylic resin composition of the present invention is far superior in its flame resistance to the conventional flame resistant acrylic resin composition wherein a copolymer of methyl methacrylate with methacrylic acid was used as the base polymer.

EXAMPLE 10

Into a separable flask equipped with a condenser, a thermometer and a stirrer, 1000 g of methyl methacrylate was introduced and heated under stirring. When the internal temperature reached 85° C., 650 mg of 2,2'-azobis-(2,4-dimethylvaleronitrile) was added thereto. The mixture was maintained at an internal temperature of 100° C. for 7 minutes, and then cooled to room temperature, whereby a partial polymer was obtained.

To 558.4 g of this partial polymer, 25.6 g of α-methyl styrene, 73 g of styrene, 73 g of maleic anhydride, 70 g of methacrylic acid, 200 g of CR-509, 1 g of Aerosol OT and 640 mg of 2,2'-azobis-(2,4-dimethylvaleronitrile) were added and dissolved. The composition thereby obtained was poured into a cell defined by two sheets of tempered glass facing to each other with a distance of 3 mm and gaskets made of polyvinyl chloride, and polymerized by immersing the cell in warm water of 65° C. for 16 hours. Then, the cell was heat-treated at 135° C. for 2 hours in an air heating furnace. After cooling, the cell was removed to obtain a resin sheet having a thickness of 3 mm. This resin sheet was subjected to a combustion test by the vertical method in accordance with Subject 94 under UL Standards. With respect to a set of 5 samples, the combustion times after being contacted with a flame for 10 seconds in the first and second trials were measured in the same manner as in Example 9, whereby the combustion time in each case was not more than 1 second, and the flame resistance was good.

COMPARATIVE EXAMPLE 8

A resin sheet having a thickness of 3 mm composed of a copolymer of methyl methacrylate with methacrylic acid was prepared in the same manner as in Example 10 except that 730 g of the partial polymer of methyl methacrylate alone was used without using α-methyl styrene, styrene and maleic anhydride.

This resin sheet was subjected to a combustion test in the same manner as in Example 10, whereby the combustion time after being contacted with a flame for 10 seconds in the first trial was about 2 seconds, but the combustion time after being contacted with a flame for 10 seconds in the second trial exceeded 30 seconds in some cases.

EXAMPLE 11

To 604 g of the partial polymer of methyl methacrylate prepared in Example 10, 28 g of α-methyl styrene, 79 g of styrene, 79 g of maleic anhydride, 60 g of methacrylic acid, 150 g of CR-509, 1 g of Aerosol OT and 672 mg of 2,2'-azobis-(2,4-dimethylvaleronitrile) were added and dissolved. The subsequent operation was conducted in the same manner as in Example 10, whereby a resin sheet having a thickness of 3 mm was obtained.

This resin sheet was subjected to a combustion test by the vertical method in accordance with Subject 94 under UL Standards in the same manner as in Example 9. With respect to a set of 5 samples, the combustion time after being contacted with a flame for 10 seconds in the first and second trials, were measured. The results are shown in Table 9.

TABLE 9

| Sample No. | 1 | 2 | 3 | 4 | 5 |
|---|---|---|---|---|---|
| Combustion time after being contacted with a flame in the first trial (seconds) | 2.5 | 2.1 | 1.1 | 1.1 | 2.9 |
| Combustion time after being contacted with a flame in the second trial (seconds) | 1.0 | 4.8 | 1.4 | 1.5 | 5.0 |

The optical characteristics of this sheet were measured in accordance with ASTM D-1003, whereby the luminous transmittance was 92.4% and the haze was 1.0%, thus showing good optical characteristics. Further, the heat distortion temperature was measured in accordance with ASTM D-648, and was found to be as good as 96.0.

COMPARATIVE EXAMPLE 9

A comparative resin sheet was prepared in the same manner as in Example 11 except that 790 g of the partial polymer of methyl methacrylate was used without using α-methyl styrene, styrene and maleic anhydride in Example 11.

This resin sheet was subjected to a combustion test in the same manner as in Example 11. The results are shown in Table 10.

TABLE 10

| Sample No. | 1 | 2 | 3 | 4 | 5 |
|---|---|---|---|---|---|
| Combustion time after being contacted with a flame in the first trial (seconds) | 1.5 | 2.0 | 1.8 | 2.4 | 2.1 |
| Combustion time after being contacted with a flame in the second trial (seconds) | 23.3 | 32.5 | 20.0 | 31.5 | 28.3 |

From the comparison of Table 9 with Table 10, it is evident that the flame resistant acrylic resin composition of the present invention exhibits superior effects.

EXAMPLE 12

Into a separable flask equipped with a condenser, a thermometer and a stirrer, 760 g of methyl methacrylate, 40 g of α-methyl styrene, 100 g of styrene and 100 g of maleic anhydride were introduced and heated under stirring. When the internal temperature reached 70° C., 1.0 g of 2,2'-azobis-(2,4-dimethylvaleronitrile) was added thereto. The mixture was maintained at an internal temperature of 95° C. for 10 minutes, and then cooled to room temperature, whereby a partial polymer was obtained. To 720 g of this partial polymer, 60 g of methacrylic acid, 200 g of CR-509 (trade name for chlorinated polyphosphate manufactured by Daihachi Kagaku Kogyosho K.K.)., 20 g of JP 504 (trade name for butyl acid phosphate manufactured by Jyohoku Chemical Industries Co. Ltd.) and 624 mg of 2,2'-azobis-(2,4-dimethylvaleronitrile) were added and dissolved. The composition thereby obtained was poured into a cell defined by two sheets of tempered glass facing to each other with a distance of 3 mm and gaskets made of polyvinyl chloride, and polymerized by immersing the cell in warm water of 65° C. for 16 hours. Then, the cell was heat-treated at 135° C. for 2 hours in an air heating furnace. After cooling, the cell was removed to obtain a resin sheet having a thickness of about 3 mm.

The physical properties of this sheet were evaluated. The results are shown in Table 11.

COMPARATIVE EXAMPLE 10

A resin sheet having a thickness of 3 mm was prepared in the same manner as in Example 12 except that a partial polymer was prepared by using 1000 g of a methyl methacrylate monomer alone instead of monomer mixture comprising methyl methacrylate, α-methyl styrene, styrene and maleic anhydride. The physical properties of this sheet were evaluated. The results are shown in Table 11.

TABLE 11

| | Outer appearance of the resin sheet | Combustion test (seconds) | | | Heat distortion temp. (°C.) | Water absorptivity (%) |
|---|---|---|---|---|---|---|
| | | First trial (max. value) | Second trial (max. value) | Total of combustion times | | |
| Example 12 | Colorless and transparent No defect in the outer appearance | 0.8 | 1.2 | 7.6 | 78.3 | 0.58 |
| Comparative Example 10 | Considerable haze Small pleats like defects were observed on the surface | 3.5 | 3.7 | 158 | 67.8 | 0.69 |

It is evident from Table 11 that the resin composition (Example 12) of the present invention has substantially improved flame resistance and heat distortion temperature as compared with the conventional flame resistant acrylic resin composition (Comparative Example 10) wherein a copolymer of methyl methacrylate with methacrylic acid was used as the base polymer, and it meets the Standard UL 94 V-O. Further, the water absorptivity is small, and an improvement in this respect is also evident.

EXAMPLE 13

To 710 g of the partial polymer prepared in Example 12, 70 g of methacrylic acid, 200 g of CR-509, 20 g of JP 504 and 624 mg of 2,2'-azobis-(2,4-dimethylvaleronitrile) were added and dissolved. The composition thereby obtained was poured into a cell defined by two sheets of tempered glass facing to each other with a distance of 3 mm and gaskets made of polyvinyl chloride, and polymerized by immersing the cell in warm water of 65° C. for 16 hours. Then, the cell was heat-treated at 135° C. for 2 hours in an air heating furnace. After cooling, the cell was removed to obtain a resin sheet having a thickness of about 3 mm. The physical properties of this sheet were evaluated. The results are shown in Table 12.

COMPARATIVE EXAMPLE 11

A resin sheet having a thickness of 3 mm was prepared in the same manner as in Example 13 except that the partial polymer prepared by using 1000 g of a methyl methacrylate monomer was used instead of the monomer mixture comprising methyl methacrylate, α-methyl styrene, styrene and maleic anhydride.

The physical properties of this sheet are shown in Table 12.

TABLE 12

| | Outer appearance of the resin sheet | Combustion test (seconds) | | | Heat distortion temp. (°C.) | Water absorptivity (%) |
|---|---|---|---|---|---|---|
| | | First trial (max. value) | Second trial (max. value) | Total of combustion times | | |
| Example 13 | Colorless and transparent No defect in the outer appearance | 0.4 | 0.6 | 4.6 | 85.0 | 0.54 |
| Comparative | Considerable haze Small | 2.5 | 26.3 | 143.8 | 81.0 | 0.70 |

TABLE 12-continued

| | Outer appearance of the resin sheet | Combustion test (seconds) | | | Heat distortion temp. (°C.) | Water absorptivity (%) |
|---|---|---|---|---|---|---|
| | | First trial (max. value) | Second trial (max. value) | Total of combustion times | | |
| Example 11 | pleats like defects were observed on the surface | | | | | |

EXAMPLE 14

To 700 g of the partial polymer prepared in Example 12, 70 g of methacrylic acid, 200 g of CR-509, 30 g of JP 504 and 616 mg of 2,2'-azobis-(2,4-dimethylvaleronitrile) were added and dissolved. The subsequent operation was conducted in the same manner as in Example 1, whereby a flame resistant acrylic resin sheet having a thickness of 3 mm was obtained. This resin sheet was subjected to a combustion test, whereby the maximum value of the combustion time in the first trial was 0.2 second and the maximum value of the combustion time in the second trial was 0.8 second. The total of combustion times was 3.4 seconds. Further, the heat distortion temperature of the resin sheet was measured and found to be 76.1° C.

Further, a flame resistant acrylic resin sheet having a thickness of 3 mm was prepared in the same manner as the above Example except that 770 g of the partial polymer was used without using methacrylic acid. This resin sheet was subjected to a combustion test, whereby the maximum value of the combustion time in the first trial was 1.1 seconds and the maximum value of the combustion time in the second trial was 26.5 seconds, and the total of combustion times was 57.8 seconds. The heat distortion temperature of the resin sheet was 62.0° C.

EXAMPLE 15

To 76.0 g of the partial polymer prepared in Example 12, 30 g of methacrylic acid, 200 g of CR-509, 10 g of JP 504 and 616 mg of 2,2'-azobis-(2,4-dimethylvaleronitrile) were added and dissolved. The subsequent operation was conducted in the same manner as in Example 12, whereby a flame resistant acrylic resin sheet having a thickness of 3 mm was obtained. This resin sheet was subjected to a combustion test, whereby the maximum value of the combustion time in the first trial was 0.9 seconds and the maximum value of the combustion time in the second trial was 6.3 seconds, and the total of combustion times was 13.8 seconds.

Further, a flame resistant acrylic resin sheet having a thickness of 3 mm was prepared in the same manner as the above Example except that 770 g of the partial polymer was used without using JP-504. This resin sheet was subjected to a combustion test, whereby the maximum value of the combustion time in the first trial was 2.3 seconds and the maximum value of the combustion time in the second trial was 30.6 seconds, and the total of the combustion times was 60.4 seconds.

EXAMPLE 16

Into a 3000 l cylindrical vertical reactor equipped with a heating jacket, a cooling jacket, a condenser and a vertical stirrer, 1000 l of a monomer mixture comprising 76.5% by weight of methyl methacrylate, 3.5% by weight of α-methyl styrene, 10% by weight of styrene and 10% by weight of maleic anhydride was fed and heated. When the monomer mixture reached 80° C., 2,2'-azobis-2,4-dimethylvaleronitrile was added as a polymerization initiator in an amount of 0.25% by weight based on the monomer mixture, and the mixture was stirred. The monomer mixture initiated the polymerization reaction, reached the saturated temperature due to the polymerization heat and started refluxing in the condenser. Upon expiration of 15 minutes from the addition of the polymerization initiator, the mixture was rapidly cooled, whereby a partial polymer having a viscosity of 2610 cp at 20° C. and a conversion to the polymer of 31%, was obtained.

To 73 parts by weight of the partial polymer prepared in the above-mentioned manner, 7 parts by weight of methacrylic acid, 20 parts by weight of CR-509 (trade name of chlorinated polyphosphate manufactured by Daihachi Kagaku Kogyosho K.K.), 1000 ppm of Aerosol OT (trade name of dioctylsulfosuccinate) and 0.4% by weight, based on the resin component, of Trigonox 36 (bis(3,5,5-trimethylhexanoyl)peroxide manufactured by Kayaku Nury Co. Ltd.) as an additional polymerization initiator, were added and dissolved under stirring. The polymerization feed material thus obtained was deaerated under reduced pressure and then poured into a continuous polymerization apparatus of FIG. 1 provided with stainless steel belts polished to have a specular surface and having a thickness of 2 mm and a width of 1200 mm and with a belt clearance adjusted to 3 mm. The feed material was polymerized at 80° C. for 30 minutes and then at 136° C. for 3 minutes, whereupon a resin sheet having a thickness of 3 mm was obtained.

This resin sheet was subjected to a combustion test. The results thereby obtained are shown in Table 13.

Further, the transparency of the resin sheet thus obtained was good, and the haze as measured by ASTM D-1003 was 1.5%.

TABLE 13

| Sample No. | 1 | 2 | 3 | 4 | 5 |
|---|---|---|---|---|---|
| Combustion time after being contacted with a flame in the first trial (seconds) | 0.9 | 1.1 | 0.8 | 0.9 | 1.0 |
| Combustion time after being contacted with a flame in the second trial (seconds) | 1.0 | 1.2 | 0.9 | 1.2 | 1.1 |

COMPARATIVE EXAMPLE 12

Into the same cylindrical vertical reactor as used in Example 16, 1000 l of a methyl methacrylate monomer alone was fed and heated. When the monomer reached 80° C., 2,2'-azobis-2,4-dimethylvaleronitrile was added as a polymerization initiator in an amount of 0.065% by weight based on the monomer, and the mixture was stirred. The monomer initiated the polymerization reaction, reached the suturated temperature due to the polymerization heat and started refluxing in the condenser. Upon expiration of 8 minutes from the addition of the polymerization initiator, the reaction mixture was rapidly cooled, whereby a partial polymer having a viscosity of 1800 cp at 20° C. and a conversion to the polymer of 22% was obtained.

To 73 parts by weight of the partial polymer thus obtained, 7 parts by weight of methacrylic acid, 20 parts by weight of CR-509, 1000 ppm of Aerosol OT and 0.083% by weight, based on the resin component, of 2,2'-azobis-2,4-dimethylvaleronitrile as an additional polymerization intiator were added and dissolved under stirring. Then, the polymerization feed material thus obtained was deaerated under reduced pressure, and then poured into the same continuous polymerization apparatus as used in Example 16 with the belt clearance set to be 3 mm. The feed material was polymerized at 74° C. for 33 minutes and then at 136° C. for 3.5 minutes, whereupon a resin sheet having a thickness of 3 mm was obtained.

This resin sheet was subjected to a combustion test in the same manner as in Example 16. The results thereby obtained are shown in Table 14.

TABLE 14

| Sample No. | 1 | 2 | 3 | 4 | 5 |
|---|---|---|---|---|---|
| Combustion time after being contacted with a flame in the first trial (seconds) | 1.0 | 2.0 | 1.3 | 1.3 | 1.5 |
| Combustion time after being contacted with a flame in the second trial (seconds) | 15.3 | 28.4 | 20.8 | 31.6 | 27.4 |

From the comparison of Tables 13 and 14, it is evident that the flame resistant acrylic resin sheet of the present invention is far superior in its flame resistance to the conventional flame resistant acrylic resin sheet wherein a copolymer of methyl methacrylate with methacrylic acid was used as the base polymer.

EXAMPLE 17

In the same manner as in Comparative Example 12, a partial polymer of methyl methacrylate having a viscosity of 3570 cp at 20° C. was prepared. To 502.6 parts by weight of the partial polymer, 25.6 parts by weight of α-methyl styrene, 73 parts by weight of styrene, 73 parts by weight of maleic anhydride, 70 parts by weight of methacrylic acid, 200 parts by weight of CR-509, 1 part by weight of Aerosol OT, 3.2 parts by weight of Trigonox 36 and 55.8 parts by weight of Acrypet VH (polymethyl methacrylate powder manufactured by Mitsubishi Rayon Co. Ltd.) were added and dissolved. Then, the polymerization feed material thus obtained was deaerated under reduced pressure, and poured to the same continuous polymerization apparatus as used in Example 16 with a belt clearance set to be 3 mm. The feed material was polymerized at 82° C. for 33 minutes and then at 136° C. for 3.5 minutes, whereupon a resin sheet having a thickness of 3 mm was obtained. The transparency of this sheet was good.

This resin sheet was subjected to a combustion test, and the combustion times in the first and second trials were measured and were found to be not more than 2 seconds in each case. Thus, flame resistance was satisfactory.

COMPARATIVE EXAMPLE 13

The partial polymer of methyl methacrylate of Example 17 having a viscosity of 3570 cp was adjusted to have a viscosity of 1100 cp by adding a methyl methacrylate monomer thereto. To 730 parts by weight of the partial polymer thus obtained, 70 parts by weight of methacrylic acid, 200 parts by weight of CR-509, 1 part by weight of Aerosol OT and 0.664 part by weight of 2,2'-azobis-2,4-dimethylvaleronitrile were added and dissolved under stirring. Then, the polymerization feed material thus obtained was deaerated under reduced pressure and poured into the same continuous polymerization apparatus as used in Example 16 with the belt clearance set to be 3 mm. The feed material was polymerized at 74° C. for 33 minutes and then at 136° C. for 3.5 minutes, whereupon a resin sheet having a thickness of 3 mm was obtained.

This resin sheet was subjected to a combustion test in the same manner as in Example 17. The results thereby obtained are shown in Table 15.

TABLE 15

| Sample No. | 1 | 2 | 3 | 4 | 5 |
|---|---|---|---|---|---|
| Combustion time after being contacted with a flame in the first trial (seconds) | 1.0 | 1.5 | 0.8 | 0.9 | 2.0 |
| Combustion time after being contacted with a flame in the second trial (seconds) | 19.8 | 30.4 | 28.4 | 26.8 | 33.0 |

From the comparison of Example 17 with Comparative Example 13 (Table 15), it is evident that the flame resistant acrylic resin sheet of the present invention is far superior in its flame resistance to the conventional flame resistant acrylic resin sheet wherein a copolymer of methyl methacrylate with methacrylic acid was used as the base polymer.

EXAMPLE 18

To 604 parts by weight of the partial polymer of methyl methacrylate prepared in Example 17, 28 parts by weight of α-methyl styrene, 79 parts by weight of styrene, 79 parts by weight of maleic anhydride, 60 parts by weight of methacrylic acid, 150 parts by weight of CR-509, 1 part by weight of Aerosol OT and 3.4 parts by weight of 2,2'-azobis-(2,4-dimethylvaleronitrile) were added and dissolved. The subsequent operation was conducted in the same manner as in Example 17, whereby a resin sheet having a thickness of 3 mm was obtained.

This resin sheet was subjected to a combustion test, whereby the maximum combustion time in the first trial was 2.3 seconds, and the maximum combustion time in the second trial was 4.8 seconds.

EXAMPLE 19

Into the same cylindrical vertical reactor as used in Example 16, 1000 l of a monomer mixture comprising 76.5% by weight of methyl methacrylate, 3.5% by weight of α-methyl styrene, 10% by weight of styrene and 10% by weight of maleic anhydride, were fed and heated. When the monomer mixture reached 80° C., 2,2'-azobis-2,4-dimethylvaleronitrile was added as a polymerization initiator in an amount of 0.25% by weight based on the monomer mixture, and the mixture was stirred. The monomer mixture initiated a polymerization reaction, reached to the saturated temperature due to the polymerization heat and started refluxing in the condenser. Upon expiration of 15 minutes from the addition of the polymerization initiator, the reaction mixture was rapidly cooled, whereby a partial polymer having a viscosity of 2490 cp at 20° C. and a conversion to the polymer of 30% was obtained.

To 73 parts by weight of the partial polymer thus obtained, 7 parts by weight of methacrylic acid, 20 parts by weight of Phosguard C-22-R (chlorinated polyphosphonate manufactured by Monsanto Co., Ltd.), 1000 ppm of dioctylsulfosuccinate as a releasing agent and 0.4% by weight, based on the resin component, of Trigonox 36 (bis(3,5,5-trimethylhexanoyl)peroxide manufactured by Kayaku Nury Co., Ltd.) as an additional polymerization initiator, were added and dissolved under stirring. Then, the polymerization feed material thus obtained was deaerated under reduced pressure and poured to the same continuous polymerization apparatus as used in Example 16 with the belt clearance set to be 3 mm. The feed material was polymerized at 80° C. for 30 minutes and then at 136° C. for 3 minutes, whereupon a flame resistant acrylic resin sheet having a thickness of 3 mm was obtained.

This resin sheet was subjected to a combustion test. The results thereby obtained are shown in Table 16.

TABLE 16

| Sample No. | 1 | 2 | 3 | 4 | 5 |
|---|---|---|---|---|---|
| Combustion time after being contacted with a flame in the first trial (seconds) | 0.9 | 0.8 | 0.9 | 0.7 | 0.8 |
| Combustion time after being contacted with a flame in the second trial (seconds) | 1.0 | 0.9 | 0.9 | 0.8 | 0.9 |

Further, for the purpose of comparison, a partial polymer having a viscosity of 1750 cp at 20° C. and a conversion to the polymer of 21% was prepared in the same manner as in Comparative Example 12 except that a methyl methacrylate monomer alone was used instead of the monomer mixture comprising methyl methacrylate, $\alpha$-methyl styrene, styrene and maleic anhydride. With use of this syrup-like partial polymer, a resin sheet containing Phosguard C-22-R and having a thickness of 3 mm was prepared in the same manner as in the case of the syrup wherein the above-mentioned monomer mixture was used.

This sheet was subjected to a combustion test. The results thereby obtained are shown in Table 17.

TABLE 17

| Sample No. | 1 | 2 | 3 | 4 | 5 |
|---|---|---|---|---|---|
| Combustion time after being contacted with a flame in the first trial (seconds) | 1.3 | 1.2 | 1.6 | 1.4 | 1.6 |
| Combustion time after being contacted with a flame in the second trial (seconds) | 16.4 | 24.1 | 9.4 | 14.3 | 20.8 |

EXAMPLE 20

Into a 3000 l cylindrical vertical reactor equipped with a heating jacket, a cooling jacket, a condenser and a vertical stirrer, 1000 l of a monomer mixture comprising 76.5% by weight of methyl methacrylate, 3.5% by weight of $\alpha$-methyl styrene, 10% by weight of styrene and 10% by weight of maleic anhydride, was fed and heated. When the monomer mixture reached 80° C., 2,2'-azobis-2,4-dimethylvaleronitrile was added as a polymerization initiator in an amount of 0.25% by weight based on the monomer mixture, and the mixture was stirred. The monomer mixture initiated a polymerization reaction, reached the saturation temperature due to the polymerization heat and started refluxing in the condenser. Upon expiration of 15 minutes from the addition of the polymerization initiator, the reaction mixture was rapidly cooled, whereby a partial polymer having a viscosity of 2610 cp at 20° C. and a conversion to the polymer of 31% was obtained.

To 72 parts by weight of the partial polymer thus obtained, 6 parts by weight of methacrylic acid, 20 parts by weight of CR-509 (chlorinated polyphosphate manufactured by Daihachi Kagaku Kogyosho K.K.), 2 parts by weight of JP-504 (butyl acid phosphate manufactured by Jyohoku Chemical Industries Co. Ltd.), 1000 ppm of Aerosol OT (Dioctylsulfosuccinate) and 0.4% by weight, based on the resin component, of Trigonox 36 (bis(3,5,5-trimethylhexanoyl)peroxide manufactured by Kayaku Nury Co., Ltd) as an additional polymerization initiator, were added and dissolved under stirring. Then, the polymerization feed material thus obtained was deaerated under reduced pressure and poured into a continuous polymerization apparatus of FIG. 1 provided with stainless steel belts polished to have a specular surface and having a thickness of 2 mm and a width of 1200 mm and with a belt clearance set to be 3 mm. The feed material was polymerized at 80° C. for 30 minutes and then at 136° C. for 3 minutes, whereupon a resin sheet having a thickness of 3 mm was obtained.

The physical properties of this sheet were evaluated. The results thereby obtained are shown in Table 18. Further, the transparency of the resin sheet thus obtained was good and the haze as measured by ASTM D-1003, was 1.3%.

COMPARATIVE EXAMPLE 14

Into the same cylindrical vertical reactor as used in Example 20, 1000 l of a methyl methacrylate monomer alone was fed instead of the monomer mixture comprising methyl methacrylate, $\alpha$-methyl styrene, styrene and maleic anhydride, and heated. When the monomer reached 80° C., 2,2'-azobis-2,4-dimethylvaleronitrile was added as a polymerization initiator in an amount of 0.065% by weight based on the monomer, and the mixture was stirred. The monomer initiated a polymerization reaction, reached the saturation temperature due to the polymerization heat and started refluxing in the condenser. Upon expiration of 8 minutes from the addition of the polymerization initiator, the reaction mixture was rapidly cooled, whereby a partial polymer having a viscosity of 1800 cp at 20° C. and a conversion to the polymer of 22% was obtained.

To 72 parts by weight of the partial polymer thus obtained. 6 parts by weight of methacrylic acid, 20 parts by weight of CR-509, 1000 ppm of Aerosol OT and 0.083% by weight, based on the resin component, of 2,2'-azobis-2,4-dimethylvaleronitrile as an additional polymerization initiator, were added and dissolved under stirring. Then, the polymerization feed material thus obtained was deaerated under reduced pressure, and poured in the same continuous polymerization apparatus as used in Example 20 with the belt clearance set to be 3 mm. The feed material was polymerized at 74° C. for 33 minutes and then at 136° C. for 3.5 minutes, whereupon a resin sheet having a thickness of 3 mm was obtained.

The physical properties of this resin sheet were evaluated. The results thereby obtained are shown in Table 18.

TABLE 18

| | Outer appearance of the resin sheet | Combustion test (seconds) | | | Heat distortion temp. (°C.) | Water absorptivity (%) |
|---|---|---|---|---|---|---|
| | | First trial (max. value) | Second trial (max. value) | Total of combustion times | | |
| Example 20 | Colorless and transparent No defect in the outer appearance | 0.9 | 1.4 | 8.0 | 78.1 | 0.56 |
| Comparative Example 14 | Considerable haze Small pleats like defects were observed on the surface | 3.0 | 35.2 | 156 | 67.5 | 0.67 |

It is evident from Table 18 that the resin product (Example 20) of the present invention is far superior in the flame resistance and the heat distortion temperature to the conventional flame resistant acrylic resin composition (Comparative Example 14), and it meets the Standard of UL-94V-O. Further, the water absorptivity is also small. Thus, it is seen that the physical properties have been improved.

EXAMPLE 21

In the same manner as in Comparative Example 14, a partial polymer of methyl methacrylate having a viscosity of 3570 cp at 20° C. was prepared. To 502.6 parts by weight of this partial polymer, 25.6 parts by weight of α-methyl styrene, 73 parts by weight of styrene, 73 parts by weight of maleic anhydride, 70 parts by weight of methacrylic acid, 200 parts by weight of CR-509, 20 parts by weight of JP-504, 1 part by weight of Aerosol OT, 3.2 parts by weight of Trigonox 36 and 55.8 parts by weight of Acrypet VH (polymethyl methacrylate powder manufactured by Mitsubishi Rayon Co., Ltd.) were added and dissolved. Then, the polymerization feed material thus obtained was deaerated under reduced pressure and injected into the same continuous polymerization apparatus as used in Example 20 with the belt clearance set to be 3 mm. The feed material was polymerized at 82° C. for 30 minutes and then at 136° C. for 3.5 minutes, whereupon a resin sheet having a thickness of 3 mm was obtained. The transparency of this sheet was good.

The physical properties of this sheet were evaluated. The results thereby obtained are shown in Table 19.

COMPARATIVE EXAMPLE 15

The partial polymer of methyl methacrylate of Example 21 having a viscosity of 3540 cp was adjusted to have a viscosity of 1100 cp by adding a methyl methacrylate monomer thereto. To 710 parts by weight of the partial polymer thus obtained, 70 parts by weight of methacrylic acid, 200 parts by weight of CR-509, 20 parts by weight of JP-504, 1 part by weight of Aerosol OT and 0.664 part by weight of 2,2'-azobis-2,4-dimethylvaleronitrile were added and dissolved under stirring. Then, the polymerization feed material thus obtained was deaerated under reduced pressure and poured into the same continuous polymerization apparatus as used in Example 20 with the belt clearance set to be 3 mm. The feed material was polymerized at 74° C. for 33 minutes and then at 136° C. for 3.5 minutes, whereupon a resin sheet having a thickness of 3 mm was obtained.

The physical properties of this sheet were measured. The results are shown in Table 19.

TABLE 19

| | Outer appearance of the resin sheet | Combustion test (seconds) | | | Heat distortion temp. (°C.) | Water absorptivity (%) |
|---|---|---|---|---|---|---|
| | | First trial (max. value) | Second trial (max. value) | Total of combustion times | | |
| Example 21 | Colorless and transparent No defect in the outer appearance | 0.5 | 0.7 | 5.0 | 84.8 | 0.51 |
| Comparative Example 15 | Considerable haze Small pleats like defects were observed on the surface | 2.3 | 27.4 | 146.3 | 80.7 | 0.64 |

EXAMPLE 22

To 700 parts by weight of the partial polymer prepared in Example 20, 70 parts by weight of methacrylic acid, 200 parts by weight of CR-509, 30 parts by weight of JP-504 and 3.5 parts by weight of bis(4-t-butylcyclohexyl)peroxy dicarbonate were added and dissolved. The subsequent operation was conducted in the same manner as in Example 20, whereby a resin sheet having a thickness of 3 mm was obtained. This resin sheet was subjected to a combustion test, whereby the maximum value of the combustion time in the first trial was 0.4 second, the maximum value of the combustion time in the second trial was 0.8 second and the total of the combustion times was 4.0 seconds. Further, the heat distortion temperature of this resin sheet was measured and found to be 75.8° C.

Further, a flame resistant acrylic resin sheet having a thickness of 3 mm was prepared in the same manner as in the above Example except that 770 parts by weight of the partial polymer was used without using methacrylic acid. This resin sheet was subjected to a combustion test, whereby the maximum value of the combustion time in the first trial was 1.2 second, but the maximum value of the combustion time in the second trial was 28.3 seconds and the total of the combustion times was 49.7 seconds. Further, the heat distortion temperature of the resin sheet was 62.4° C.

EXAMPLE 25

To 760 parts by weight of the partial polymer prepared in Example 20, 30 parts by weight of methacrylic acid, 200 parts by weight of CR-509, 10 parts by weight of JP-504 and 3.4 parts by weight of 2,2'-azobis-(2,4-dimethylvaleronitrile) were added and dissolved. The subsequent operation was conducted in the same manner as in Example 20, whereby a resin sheet having a thickness of 3 mm was obtained. This resin sheet was subjected to a combustion test, whereby the maximum value of the combustion time in the first trial was 0.9 second, the maximum value of the combustion time in the second trial was 5.8 seconds and the total of the combustion times was 12.9 seconds.

Further, a resin sheet having a thickness of 3 mm was prepared in the same manner as in this Example except that 770 parts by weight of the syrup-like partial polymer was used without using JP-504. This resin sheet was subjected to a combustion test, whereby the maximum value of the combustion time in the first trial was 2.5 seconds, the maximum value of the combustion time in the second trial was 34.2 seconds and the total of the combustion times was 65.8 seconds.

EXAMPLE 26

Into the same cylindrical vertical reactor as used in Example 20, 1000 l of a monomer mixture comprising 76% by weight of methyl methacrylate, 4% by weight of α-methyl styrene, 10% by weight of styrene and 10% by weight of maleic anhydride, was fed and heated. When the monomer mixture reached 80° C., 2,2'-azobis-2,4-dimethylvaleronitrile was added as a polymerization initiator in an amount of 0.25% by weight based on the polymer mixture, and the mixture was stirred. The monomer mixture initiated a polymerization reaction, reached to the saturation temperature by the polymerization heat and started refluxing in the condenser. Upon expiration of 15 minutes from the addition of the polymerization initiator, the reaction mixture was rapidly cooled, whereby a partial polymer having a viscosity of 2530 cp at 20° C. and a conversion to the polymer of 30.5% was obtained.

To 72 parts by weight of the partial polymer thus obtained, 6 parts by weight of methacrylic acid, 20 parts by weight of Phosguard C-22-R (chlorinated polyphosphonate manufactured by Monsanto Co., Ltd.), 2 parts by weight of JP-504 (butyl acid phosphate manufactured by Jyohoku Chemical Industries Co., Ltd.) and 0.4% by weight, based on the resin component, of Trigonox 36 (bis(3,5,5-trimethylhexanoyl)peroxide manufactured by Kayaku Nury Co., Ltd.) as an additional polymerization initiator, were added and dissolved under stirring. Then, the polymerization feed material thus obtained was deaerated under reduced pressure and poured into the same continuous polymerization apparatus as used in Example 20 with the belt clearance set to be 3 mm. The feed material was polymerized at 80° C. for 30 minutes and then at 136° C. for 3 minutes, whereupon a resin sheet having a thickness of 3 mm was obtained.

The physical properties of this sheet were evaluated. The results are shown in Table 20 (Sample No. 1).

Further, for the purpose of comparison, a syrup-like partial polymer having a viscosity of 1830 cp at 20° C. and a conversion to the polymer of 22.1% was prepared in the same manner as in Comparative Example 14 by using a methyl methacrylate monomer alone. By using this syrup-like partial polymer, the operation of this Example was repeated to obtain a resin sheet having a thickness of 3 mm.

The physical properties of this sheet were evaluated. The results thereby obtained are shown in Table 20 (Sample No. 2).

TABLE 20

| Sample No. | Outer appearance of the resin sheet | Combustion test (seconds) First trial (max. value) | Combustion test (seconds) Second trial (max. value) | Combustion test (seconds) Total of combustion times | Heat distortion temp. (°C.) | Water absorptivity (%) |
|---|---|---|---|---|---|---|
| 1 | Colorless and transparent No defect in the outer appearance | 0.3 | 0.4 | 2.6 | 75.4 | 0.56 |
| 2 | Considerable haze Small pleats like defects were observed on the surface | 4.0 | 32.0 | 150.8 | 68.5 | 0.70 |

We claim:

1. A flame resistant acrylic resin composition comprising a polymer composed of from 40 to 88% by weight of methyl methacrylate, from 1 to 15% by weight of α-methyl styrene, from 5 to 15% by weight of styrene, from 5 to 15% by weight of maleic anhydride and from 1 to 15% by weight of methacrylic acid, and a flame retardant.

2. The flame resistant acrylic resin composition according to claim 1, wherein the flame retardant is a halogenated polyphosphonate.

3. The flame resistant acrylic resin composition according to claim 1, wherein the flame retardant is a halogen-containing condensed phosphoric acid ester.

4. The flame resistant acrylic resin composition according to claim 1, wherein the flame retardant is a combination of a halogenated polyphosphonate and an alkyl acid phosphate.

5. The flame resistant acrylic resin composition according to claim 1, wherein the flame retardant is a combination of a halogen-containing condensed phosphoric acid ester and an alkyl acid phosphate.

6. The flame resistant acrylic resin composition according to claim 2, wherein the halogenated polyphosphonate is a chlorinated polyphosphonate.

7. The flame resistant acrylic resin composition according to claim 4, wherein the halogenated polyphosphonate is a chlorinated polyphosphonate.

8. The flame resistant acrylic resin composition according to claim 3, wherein the halogen-containing condensed phosphoric acid ester is a chlorinated polyphosphate.

9. The flame resistant acrylic resin composition according to claim 5, wherein the halogen-containing condensed phosphoric acid ester is a chlorinated polyphosphate.

10. The flame resistant acrylic resin composition according to claim 8, wherein the chlorinated polyphosphate has a phosphorus content of from 5 to 30% by weight and a chlorine content of from 20 to 40% by weight.

11. The flame resistant acrylic resin composition according to claim 9, wherein the chlorinated polyphosphate has a phosphorus content of from 5 to 30% by weight and a chlorine content of from 20 to 40% by weight.

12. The flame resistant acrylic resin composition according to claim 10, wherein the chlorinated polyphosphate has a phosphorus content of from 10 to 20% by weight, a chlorine content of from 20 to 40% by weight and a molecular weight of from 300 to 1000.

13. The flame resistant acrylic resin composition according to claim 11, wherein the chlorinated polyphosphate has a phosphorus content of from 10 to 20% by weight, a chlorine content of from 20 to 40% by weight and a molecular weight of from 300 to 800.

* * * * *